United States Patent
Carter et al.

(10) Patent No.: US 10,830,600 B2
(45) Date of Patent: *Nov. 10, 2020

(54) AUTOMATED CROWD SOURCING OF A NAVIGATION ROUTE

(71) Applicant: International Business Machines Corporation, Armonk, NY (US)

(72) Inventors: William S. Carter, Round Rock, TX (US); John C. Hartley, Round Rock, TX (US); Puthukode Ramachandran, Austin, TX (US); John C. Sanchez, Pflugerville, TX (US); Zhennan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 147 days.

This patent is subject to a terminal disclaimer.

(21) Appl. No.: 16/129,058

(22) Filed: Sep. 12, 2018

(65) Prior Publication Data

US 2019/0011274 A1 Jan. 10, 2019

Related U.S. Application Data

(63) Continuation of application No. 15/007,633, filed on Jan. 27, 2016, now Pat. No. 10,132,641.

(51) Int. Cl.
*G01C 21/34* (2006.01)
(52) U.S. Cl.
CPC ................. *G01C 21/3484* (2013.01)
(58) Field of Classification Search
CPC ...................................... G01C 21/34
See application file for complete search history.

(56) References Cited

U.S. PATENT DOCUMENTS

| 8,954,860 | B1* | 2/2015 | Hands ............... G01C 21/3682 |
| | | | 715/738 |
| 10,132,641 | B2* | 11/2018 | Carter ............... G01C 21/3484 |
| 2010/0036599 | A1 | 2/2010 | Froeberg |
| 2010/0125409 | A1 | 5/2010 | Prehofer |
| 2011/0153193 | A1 | 6/2011 | Fox |
| 2013/0311088 | A1 | 11/2013 | Friedlander |
| 2015/0241225 | A1 | 8/2015 | Liu |
| 2015/0369612 | A1* | 12/2015 | Nishimura ......... G01C 21/3484 |
| | | | 701/537 |
| 2016/0063893 | A1 | 3/2016 | Kanuganti |

(Continued)

FOREIGN PATENT DOCUMENTS

WO 2014132802 2/2017

OTHER PUBLICATIONS

Goetz, Marcus, Using Crowdsourced Indoor Geodata for the Creation of a Three-Dimensional Indoor Routing Web Application, Future Internet 2012, 4, 575-591.

(Continued)

*Primary Examiner* — Hussein Elchanti
(74) *Attorney, Agent, or Firm* — Lieberman & Brandsdorfer, LLC (57) ABSTRACT

Embodiments of the invention relate to selecting a path for navigation based on a node signature and a device signature. The node signature is directly related to node attribute data. The device signature is directly related to device data. A route is selected based on a match or near match of the node and device signatures.

20 Claims, 6 Drawing Sheets

(56) References Cited

U.S. PATENT DOCUMENTS

2017/0045364 A1    2/2017  Trivedi
2017/0129500 A1    5/2017  Hipp
2017/0229045 A1*   8/2017  Mukaiyama ........... G08G 1/005

OTHER PUBLICATIONS

Park, Jun-Geun, Indoor Localization Using Place and Motion Signatures, Massachusetts Institute of Technology, Jun. 2013, pp. 1-153.
List of IBM Patents or Applications Treated as Related, Sep. 2018.

* cited by examiner

AUTOMATED CROWD SOURCING OF A NAVIGATION ROUTE

CROSS REFERENCE TO RELATED APPLICATION(S)

This application is a continuation patent application claiming the benefit of the filing date of U.S. patent application Ser. No. 15/007,633 filed on Jan. 27, 2016 and titled "Automated Crowd Sourcing of a Navigation Route", now pending, the entire contents of which are hereby incorporated by reference.

BACKGROUND

The present invention relates to crowd sourcing and dynamic route navigation. More specifically, the invention relates to separately characterizing a mobile device and elements of a navigation route, and navigating the route based on the characterizations.

Navigation is a process of ascertaining a position, and planning and following a route to a destination. There are different categories of navigation, include non-real-time and real-time. Non-real time may employ the use of a conventional map or an electronic map, finding a route from a source location to a destination location, and following the route. In one embodiment, navigation may include a passenger providing direction instructions to a driver or operator to facilitate following the route. The real-time navigation takes place through use of a navigation tool, such as a GPS or an on-line mapping application. Regardless of the form, the real-time navigation detects a source location, receives a destination location, and provides a traversal route from the source to the target. The route selected by the navigation tool may consider traffic and select the route based on current traffic patterns at the time of route selection.

Static route selection pertains to defining a starting point and an ending point, and determining a traversal route between the two defined points. Route selection may be dynamic and account for temporary obstacles. For example a report of a hazard along one route may change the selection to a different route so that the obstacle can be avoided. With the advancement of technology, route guidance has become possible on a macro level, such as electronic mapping and global positioning devices, and feedback in the form of traffic, accidents, closures, etc. However, the electronic route guidance is limited to accounting for route changes on the macro level. The route guidance does not address route modification on a micro level, and specifically guidance directed to the subject within confines of a defined area and any limitations associated with the subject.

SUMMARY

The aspects described herein include a method, computer program product, and system for dynamic route selection and navigation based on crowdsourcing.

In one aspect, a computer system is provided to implement dynamic route navigation. The computer system is configured with a processing unit operatively coupled to memory. A tool is provided in communication with the processing unit to navigate a selected route. More specifically, the tool models two or more points of interest by representing each point of interest as a node in a graph, and a path between any two nodes as an edge. The nodes and edge form a route. The tool characterizes each node in the route and assigns an associated signature to the characterized node. The tool dynamically creates a navigation route from the modeled points of interest. The creation of the route includes optimization of route selection based on the node signature and a route navigation device signature. As the route is subject to navigation, a hardware addressable component in the route is controlled. In addition, the route navigation is monitored and an operating status of the addressable component is subject to change responsive to the monitored route navigation.

In another aspect, a computer program product is provided to support dynamic route navigation. The computer program product comprises a computer readable storage device having program code embodied therewith. The program code is executable by a processing unit to model two or more points of interest, including representing each point of interest as a node in a graph, and a path between any two nodes as an edge. Program code characterizes each node in the route and assigns an associated signature to each node. Program code is provided to dynamically create a navigation route from the modeled points of interest, which includes optimization of route selection based on the node signature and the route navigation device signature. As the selected route is subject to navigation, program code controls a hardware addressable component in the route, which includes changing an operating status of the addressable component in response to the monitored route navigation.

In yet another aspect, a method is provided to navigate a selected route. Two or more points of interest in a route are modeled. Specifically, each point of interest is represented as a node in a graph, and a path between two nodes is modeled as an edge. Each node in the route is characterized and an associated signature is assigned. A navigation route is dynamically created from the modeled points of interest. As a selected route is navigated, a hardware addressable component in the route is controlled, and an operating status of the component is subject to change responsive to the route navigation monitoring.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

When considering navigating a route or path from a source to a destination, there may be few possible routes available. It is often necessary to eliminate all but one of the routes. The process of elimination is frequently based on the shortest distance from the source to the target. However, the shortest distance is not always optimal, depending on the situation. For example, a global positioning system or an online map may select a route that is longer but is free or relatively free of traffic, or the selected route may be one that avoids toll roads. There are a variety of factors that are known for use in route assessment and/or selection.

Route selection and navigation is not limited to the macro environment directed at land vehicles and associated roads. For example, route selection and navigation may be applied to an indoor venue, or similar micro environment. Regardless of the venue, outdoor across roadways or indoors within the confines of a venue, the route selection may require or benefit from modification to account for and take into consideration criteria associated with the subject that will be traversing the selected route. More specifically, the subject may have needs that require accommodation with respect to traversal of the route. The criteria may be general, such as categories of landmarks along the way that are parameters of the route traversal, or specific criteria, such as an indoor venue that is wheelchair accessible. For example, if the subject is blind and has a service animal, the subject may need a route that has a relief area for the service animal. If the subject is confined to a wheelchair, the subject will need a route that is free of obstacles, such as stairs, escalators, etc. Criteria associated with the needs of the subject are incorporated into the route selection and navigation tool and process, so that the selected route accommodates the subject on both the macro and micro levels.

The criteria of the subject may be explicitly defined and employed for route selection. At the same time, in one embodiment, the needs of the subject may be implicitly defined. Mobile communication devices are commonly configured with sensors to support device functionality. At the same time, data may be acquired from these sensors for secondary purposes, and more specifically to characterize the subject. For example, the device may be configured with an accelerometer that measures acceleration data associated with the device. Similarly, the device may be configured with a microphone that detects sound associated with the data. Other device settings may be harnessed for device signature assessment, and as such, the embodiments should not be limited to the examples herein. Data from the device sensor(s) may be gathered and assessed to create a device signature that reflects a profile of the user. For example, the profile may indicate physical impairment that relates to physical movement, or a hearing impairment. Accordingly, the device sensors may be employed to characterize one or more physical characteristics of the subject.

Device data may be explicitly defined and acquired from settings. More specifically, the subject associated with the mobile device may establish settings in the device configurations. At the same time, device data may be implicitly acquired. More specifically, crowdsourcing may be used to gather device data associated with the subject. For example, establishing a connection to a public wireless internet connection enables receivers in the network to gather data from the device, such as device settings and data gathered through use of the device during connectivity. Although the connection may be at no charge, the associated fee may be implicit in the form of access to device settings and sensor data.

Figure 1:
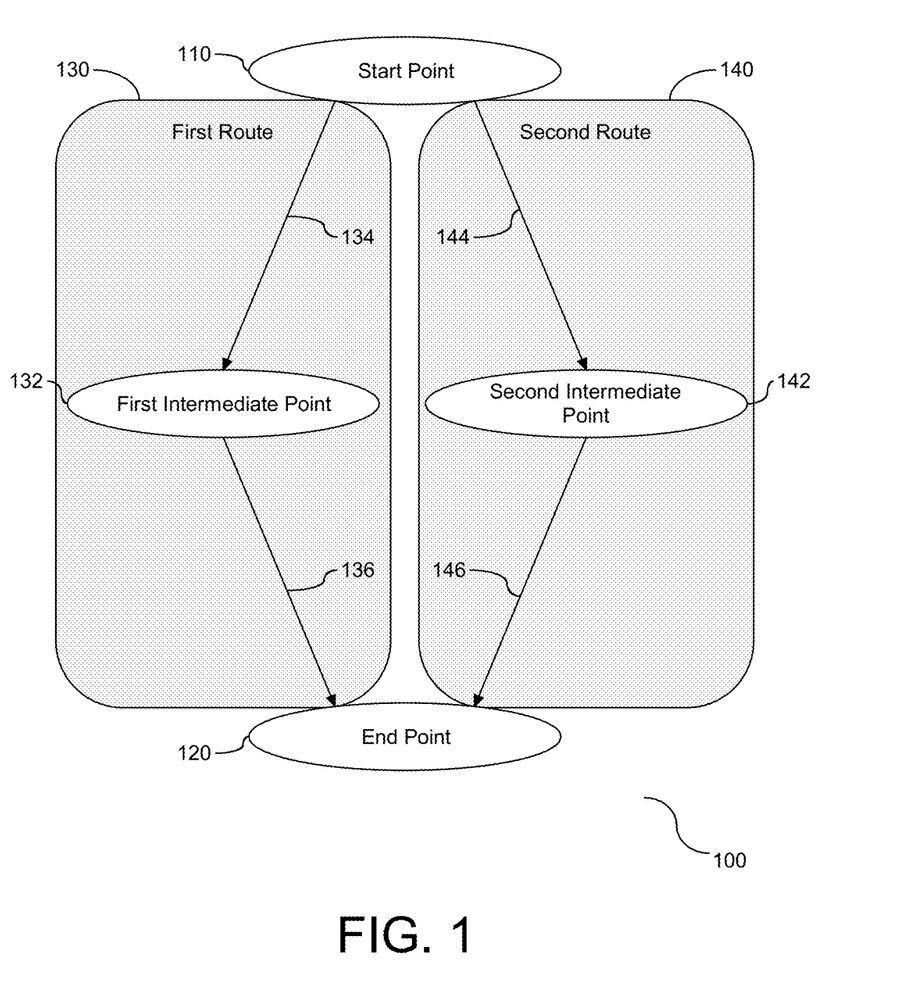
FIG. 1 depicts a block diagram illustrating basic components of a route to be navigated.

Each route subject to navigation is defined with a start location and an end location, and may further be defined into nodes and segments between the start and end locations. With reference to FIG. 1, a block diagram (100) is provided illustrating basic components of a route to be navigated. In one embodiment, the route includes two or more points of interest, including the start location and the end location. Beyond these two points, a point of interest may be, for example, a turning point, an obstacle, or any point along the route that may affect the course of travel. Each point of interest is defined as a node, and a path between two adjacent nodes is defined as a segment or edge of the graph. That is, a segment represents a mode of traversal between consecutive or adjacently positioned nodes in the graph. For example, a segment may be a walkway, a road, a stairway, a sidewalk, a fire pole, an elevator, an escalator, a train, a bus, etc.

As shown in the example diagram, the start point (110) is a point of interest. Similarly, the end point (120) is another point of interest. There are two optional routes provided in this example diagram, with both routes having the same start and end points (110) and (120) respectively. A first route (130) has a first intermediate point of interest (132), and a second route (140) has a second intermediate point of interest (142). The first route has two segments (134) and (136), with the first segment (134) extending from the start point (110) to the first intermediate point of interest (132) and the second segment (136) extending from the first intermediate point of interest (132) to the end point (120). Similarly, the second route (140) has two segments (144) and (146), with the first segment (144) extending from the start point (110) to the second intermediate point of interest (142), and the second segment (146) extending from the second intermediate point of interest (142) to the end point (120). Accordingly, each route has at least two points of interest, i.e. the start point and the end point, represented as nodes and at least one segment, represented as an edge, to connect the at least two nodes.

Each node and segment is associated with one or more defining characteristics. Examples of these characteristics include, but are not limited to, physical characteristics and accessibility characteristics. Crowdsourcing obtains data by enlisting the services of a number of people, typically via the Internet. For example, in a defined venue such as an airport, mobile devices may be logged onto a public Internet connection. The cost of the connection may be the ability to gather crowdsourcing data for each connected device during the connection period. As subjects traverse nodes and associated segments sensor data from each of the subjects may be acquired from their mobile communication devices. In one embodiment, pedestrians equipped with a cell phone are tracked as they traverse across nodes or segments. Gathered data may indicate the speed or pace associated with traversal, stopping points along a segment, whether the subject has a visual or hearing impairment, etc. The crowdsourcing data may be employed at a later point in time to compare with the profile of one or more subjects.

Figure 2:
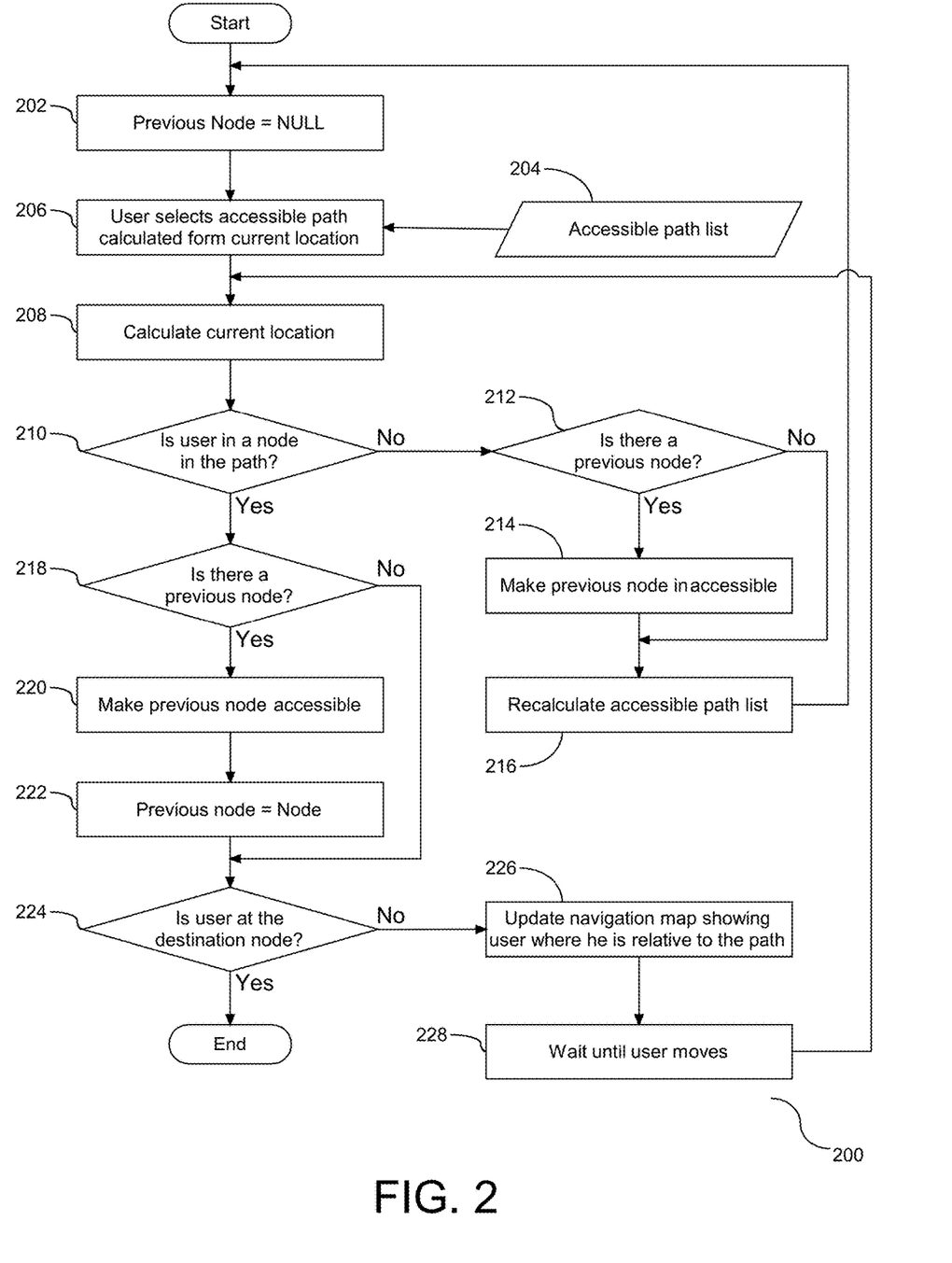
FIG. 2 depicts a flow chart illustrating a process for optimizing a route based on a node signature and a subject signature.

Referring to FIG. 2, a flow chart (200) is provided illustrating a process for optimizing a route based on a node signature and a subject signature. As the subject starts navigation of a new route, the prior node is set to a null value (202). The prior node has already been traversed. From an accessible route list having one or more available routes (204), the subject selects a route to be traversed as calculated from the current location of the subject (206). Following the route selection at step (206), a current location of the subject is calculated (208). In one embodiment, a sensor embedded into a mobile device is employed to assess the current location, such as a global positioning sensor. It is then determined if the subject is located at a node, such as a point of interest, or segment in the route (210). A negative response to the determination at step (210) is followed by determining if there is a prior node (212). A positive response to the determination at step (212) is an indication that the prior node is inaccessible (214). Details of the indication at step (214) are shown and described in FIG. 4. Following step (214) or a negative response to the determination at step (212), an accessible path list is re-calculated (216) and the process returns to step (202). Accordingly, as shown, an accessible route is selected and a current location of the subject is ascertained.

At step (210), the assessment pertains to location of the subject with respect to a node or segment in the selected route. A positive response to the determination at step (210) is followed by assessing if there is a prior node in the selected route (218). If there is a prior node or segment, it is clear that the subject is at a subsequent node or segment in the selected route and the prior node or segment is accessible. As such, the prior node or segment is indicated as accessible by the subject (220) and the prior node is set to the current node (222). Details of the indication at step (220) are shown and described in FIG. 3. Following step (222) or a negative response to the determination at step (218), it is determined if the subject is at the destination node (224). More specifically, it is determined if the subject has reached their destination and completed the route traversal. A negative response to the determination at step (224) is followed by updating an associated navigation map showing the subject where they are relative to the selected route (226). At such time as the subject moves (228), the process returns to step (208) to calculate the current location. The route optimization process concludes when it is determined that the subject is at the destination node of the selected route.

As shown in FIG. 2, when the subject has completed traversal of a node in the selected route, the node is indicated as accessible. At the same time, data associated with the subject may be gathered during traversal of the accessible node. The data contributes to a signature profile of the accessible node. For example, accelerometer data or mobile device settings may be obtained from the subject during traversal of the accessible node. In one embodiment, the route traversal data may be expanded to include route segments between nodes, with data acquired to indicate accessibility of a segment and obtaining device data from the subject during traversal of the segment. Accordingly, each node and segment of the traversed route may be profiled to independently characterize accessibility of the nodes and segments of each traversed route.

Figure 3:
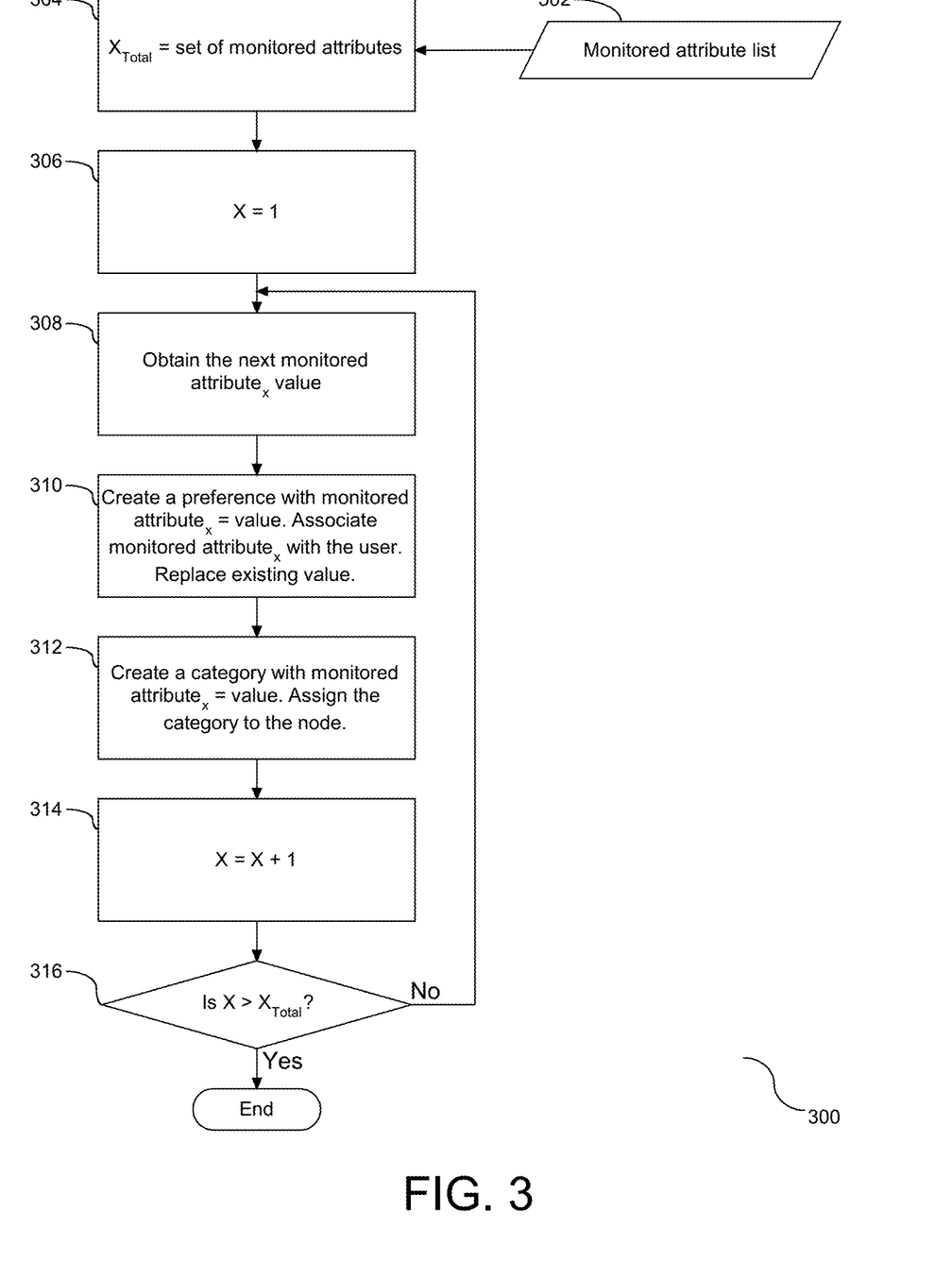
FIG. 3 depicts a flow chart illustrating a process for characterizing a node as accessible.

As shown and described in FIG. 2, nodes of the selected route are indicated as accessible or inaccessible by each user traversing the route. A node in the route may have limited accessibility depending on the limitations associated with the subject. Referring to FIG. 3, a flow chart (300) is providing illustrating a process for characterizing a node as accessible. Nodes may be configured to monitor a set of attributes, also referred to herein as a monitored attribute list (302). In one embodiment, a preference is created for each sensor, phone setting or declared attribute. Similarly, in one embodiment, the set of attributes to be monitored may be limited depending on the setting of the associated mobile device. The list of attributes is not static and may be subject to change. The variable $X_{Total}$ is set to the number of attributes being monitored at the accessible node (304), and an associated attribute counting variable is initialized (306). The monitored attribute$_X$ value from the subject operatively coupled to or in communication with the node is obtained (308). Examples of the monitored values include, but are not limited to, accelerometer signature, talkback settings, etc. In one embodiment, the accelerometer signature is a profile of the accelerometer data for the device during traversal of the node. Accordingly, at each accessible node, the monitored attribute data is acquired for the subject.

Subject values may be characterized for the accessible node. As shown, following step (308), a preference value with the monitored attribute$_X$ is created to replace an existing value (310). The subject data values are characterized as the subject traverses the node. For example, if the setting of the subject has an activated talkback and the accelerometer set to walking, these data values can be added to the node. In one embodiment, the node acquires data from multiple subjects and the data acquired from the multiple subjects is processed to obtain statistical data values for each setting, such as a maximum value, a mean, standard deviation, etc., and in one embodiment obtains a normalized value across the data set. Following step (310), a category with the monitoring attribute$_X$ is created and assigned to the node (312). This assignment enables the node to be accessible for that monitored attribute. More specifically, at step (312), the node is characterized based on the attribute value as the subject travels through the node. Following the characterization at step (312), the attribute counting variable is incremented (314), and it is determined if all of the attributes have been assessed (316). A negative response to the determination at step (316) is followed by a return to step (308) to continue with node characterization for each monitored attribute, X. However, a positive response concludes the node characterization process. The accessible node characterization process is shown as a serial algorithm. In one embodiment, the algorithm may be modified to assess all of the attributes in parallel. Accordingly, as shown herein, the accessible node characterization is dynamic and learned as the subject traverses across or through each node in the route.

As shown and described in FIG. 2, a node along the route traversal may be characterized as inaccessible. It is important to assess inaccessible nodes so that the data may be employed for route characterization. For example, a node may be accessible to a subject with one set of attribute values, but may be inaccessible to a different subject with a second set of attribute values. Similarly, characteristics of the node may change over time, and the dynamic node characterization enables the node characteristics to remain current. At the same time, the attributes of the subject may vary over time, and the accessibility of the nodes in the route adapt based on the associated attribute data.

Figure 4:
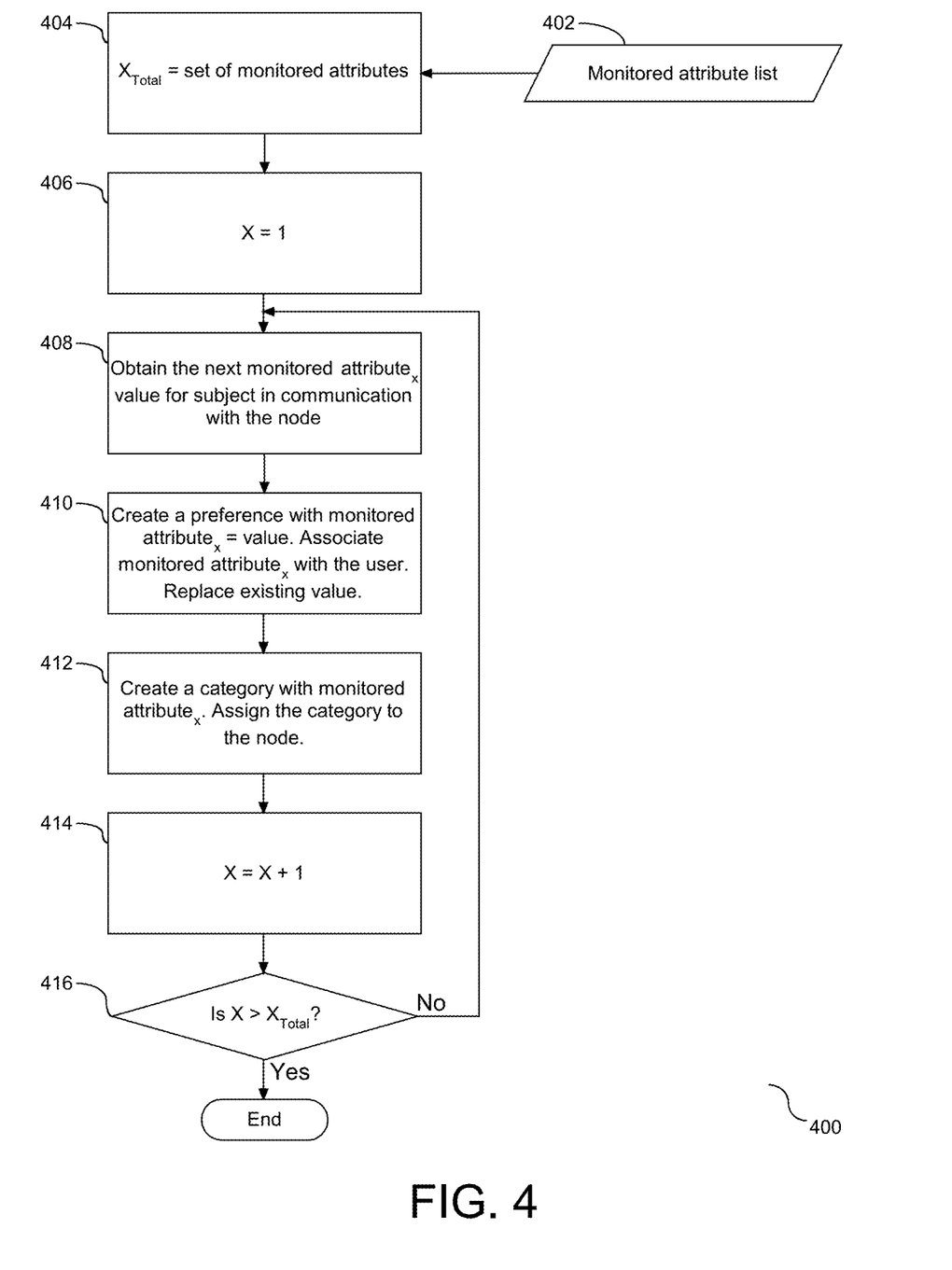
FIG. 4 depicts a flow chart illustrating a process for characterizing a node as inaccessible.

Referring to FIG. 4, a flow chart (400) is provided illustrating a process for characterizing a node as inaccessible. Similar to the process shown and described in FIG. 3, nodes may be configured to monitor a set of attributes, also referred to herein as a monitored attribute list (402). In one embodiment, the set of attributes to be monitored may be limited depending on one or more settings of the associated mobile device. As discussed above, attribute values are subject to change. In addition, the list of attributes may be subject to change. The variable $X_{Total}$ is set to the number of attributes being monitored at the node (404), and an associated attribute counting variable is initialized (406). The monitored attribute$_X$ value from the subject operatively coupled to or in communication with the node is obtained (408). Examples of the monitored values include, but are not limited to, accelerometer signature, talkback settings, etc. Accordingly, at each inaccessible node, the monitored attribute data is acquired for the subject.

Subject values may be characterized for the inaccessible node. As shown, following step (408), a preference value with the monitored attribute$_X$ is created to replace an existing value (410). The subject data values are characterized as the subject traverses the node. For example, if the setting of the subject has an activated talkback and the accelerometer set to walking, these data values can be added to the node. In one embodiment, the node acquires data from multiple subjects, and this acquired data may be processed to obtain statistical data values for each setting, such as a maximum value, a mean, standard deviation, etc., and in one embodiment obtains a normalized value across the data set. Following step (410), a category with the monitoring attribute$_X$ is created and assigned to the node (412). This assignment enables the node to be highlighted as inaccessible for that monitored attribute. More specifically, at step (412), the node is characterized based on the attribute value as the subject travels through the node. Following the characterization at step (412), the attribute counting variable is incremented (414), and it is determined if all of the attributes have been assessed (416). A negative response to the determination at step (416) is followed by a return to step (408) to continue with node characterization for each attribute, X. However, a positive response concludes the node characterization process. Similar to the algorithm shown and described for an accessible node characterization, the inaccessible node characterization process is shown as a serial algorithm. In one embodiment, the algorithm may be modified to assess all of the attributes in parallel. Accordingly, as shown herein, the inaccessible node characterization is dynamic and learned as the subject traverses across or through each node in the route.

As described herein, the mobile device may be configured with an accelerometer. As the subject in communication with the mobile device traverses the route, and specifically the individual nodes that comprise the route, accelerometer data is gathered from the mobile device. More specifically, the node acquires the accelerometer reading as the subject is passing through the nodes and segments of the route. Each accelerometer will have a pattern that captures movement of the subject. Whether the accelerometer reading is associated with walking or running may be significant. Rather, as a subsequent subject traverses the node(s) and/or segment(s), the accelerometer data of the next subject is obtained, and compared to one or more prior accelerometer readings. In one embodiment, the determination of accessibility may entail a comparison of accelerometer data read from different subjects, and the characterization of the readings, e.g. accessible or inaccessible.

Prior to route traversal, the nodes and segments that comprise the route may be defined or undefined. For a defined node, a subsequent traversal acquires subject data and a comparison with one or node defining characteristic. Similarly, in one embodiment, the nodes may be undefined prior to an initial traversal. As the initial subject traverses the route, the nodes are defined based on data acquired from the subject and whether or not the subject actually traverses the nodes and/or segments. In one embodiment, a node may be classified as inaccessible for a first device signature, and may be classified as accessible for a second device signature. Similarly, accessibility of the node may change for a variety of reasons and situations. For example, in one embodiment, the change may be due to a node defining characteristic. For example, a node with an elevator may be defined as accessible to a subject in a wheelchair, but maintenance of the elevator may temporarily or permanently change the defining characteristic of the node to inaccessible for a subject in the wheelchair. At the same time, the node may continue to be classified as accessible to any subject not bound to a wheelchair, and who is able to use an associated stairway. Accordingly, node classification(s) is dynamically subject to change based on the node and/or subject characteristics.

Figure 5:
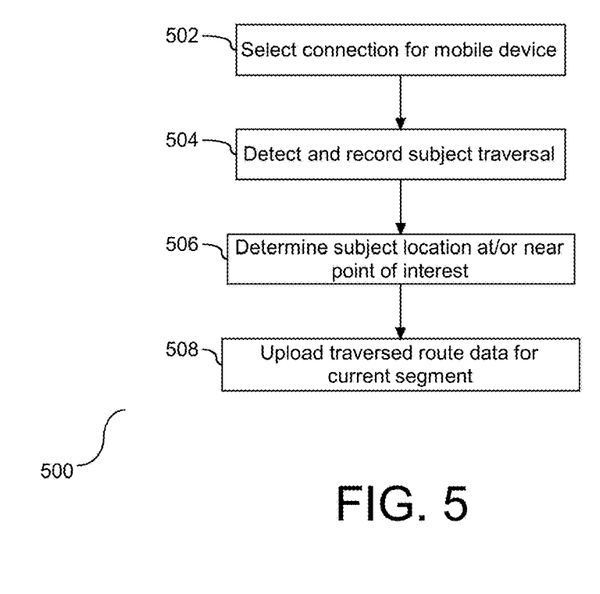
FIG. 5 depicts a flow chart illustrating a process for tracking movement of a pedestrian.

As demonstrated herein, data is tracked in real-time. Referring to FIG. 5, a flow chart (500) is provided illustrating tracking movement of a pedestrian. Upon entry into a venue, such as an airport, the subject selects to log onto the wireless internet connection provided to patrons of the venue (502). The location of all significant points of interest in the venue is mapped using wireless internet connectivity, Bluetooth, etc. In one embodiment, pedestrians equipped with connected mobile devices, such as cellphones, tablets, etc. are tracked as they travel through a venue, such as an airport, a shopping mall, etc. As the subject walks through the venue, the direction being traversed and the number of steps may be detected and recorded (504). Each point of interest in the venue has an identifier. As the subject is determined to be within the vicinity of any point of interest (506), the traversed route information collected since any prior encounter with another point of interest or since the beginning of the route tracking is uploaded to a server (508). The data uploaded at step (508) represents a viable segment between two nodes, e.g. two points of interest. This viable segment can subsequently be offered to a different subject as a viable segment to traverse.

The route traversal and tracking data may be extrapolated to address energy conservation and/or efficiency of the traversal. For example, an appliance such as an elevator or a light may have an addressable control mechanism. By tracking the mobility of the subject via the mobile device sensor, the route traversal can be monitored as the subject navigates a space passing by points of interest. An elevator can be controlled to arrive at or near the time the subject approaches the elevator entry. Similarly, a light in a specific location may be turned on as the subject is entering the venue. Accordingly, traversal of the route may be facilitated by controlling addressable components located along segments or nodes in the route.

Figure 6:
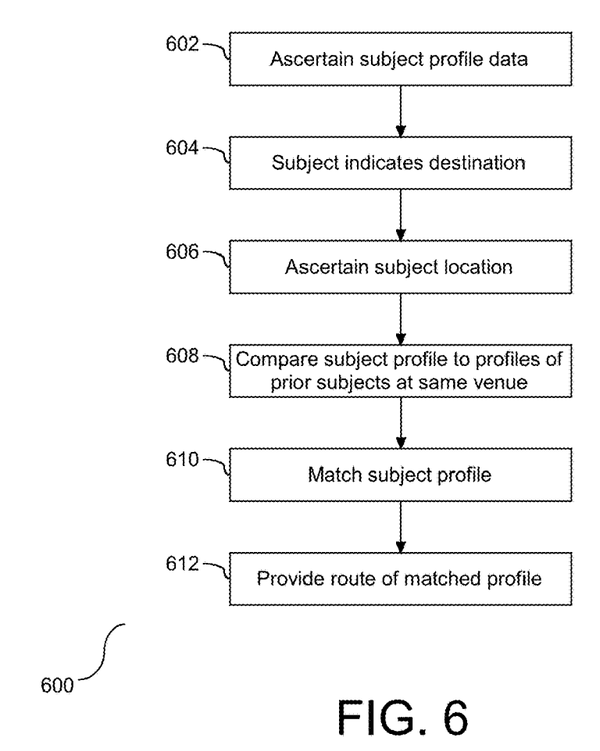
FIG. 6 depicts a flow chart illustrating a process for matching profiles and associated routes for traversal.

The subject associated with the mobile device may have an impairment, or in one embodiment a disability. The device may have settings that are associated with the impairment. This type of impairment is referred to as declared. At the same time, the impairment may not be explicit, but may become known by observing characteristics of the subject during route traversal. This type of impairment is referred to as detected. Referring to FIG. 6, a flow chart (600) is provided illustrating a process for matching profiles and associated routes for traversal. The profile of the subject is ascertained (602), either from one or more settings of their mobile device or from profile data associated with the device. The subject indicates their destination (604). At the same time, the location of the subject is either known or is detected (606). The profile of the subject is compared to profiles of prior subjects of the same venue (608). The profile of the subject is matched with at least one of the prior subjects (610) and a route that matches the profile is provided (612). In one embodiment, the nodes and segments are subject to changes, and a weighting of the age of the profile is employed to strengthen the value of a recent profile and to weaken the value of an older profile. Accordingly, the profiling of prior subjects is utilized to match the new subject to a prior subject, and in one embodiment, to a most recent subject.

Figure 7:
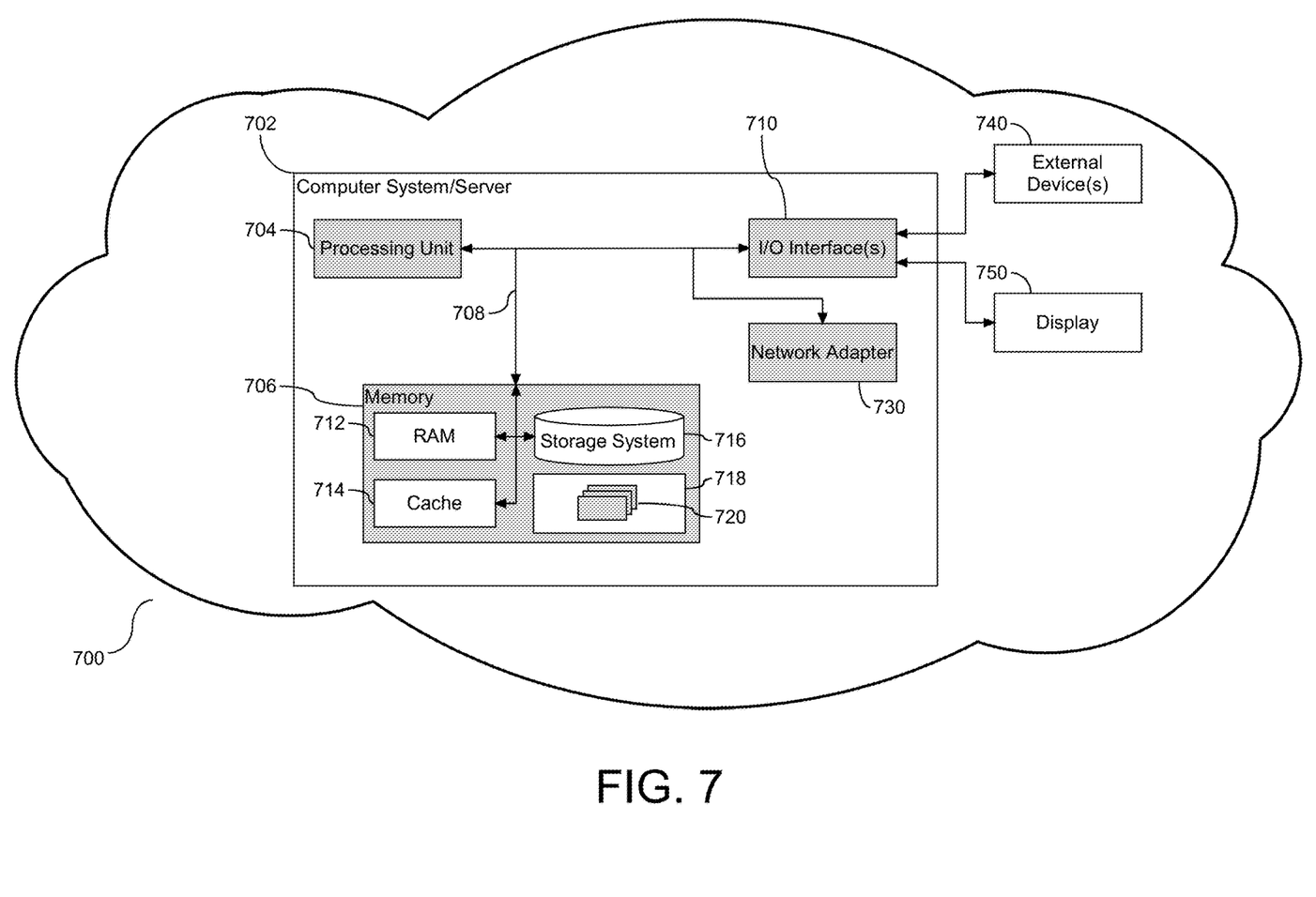
FIG. 7 depicts a block diagram illustrating an example of a computer system for performing the embodiments described above with respect to FIGS. 1-6.

With reference to FIG. 7, a block diagram (700) is provided illustrating an example of a computer system (702), hereinafter referred to as a host (702), for performing the embodiments described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and filesystems (e.g., distributed storage environments and distributed cloud computing environments) that include any of the above systems or devices, and the like.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, host (702) is shown in the form of a general-purpose computing device. The components of host (702) may include, but are not limited to, one or more processors or processing units (704), a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (712) and/or cache memory (714). Host (702) further includes other removable/non-removable, volatile/non-volatile computer system storage media. By way of example only, storage system (716) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces. As will be further depicted and described below, memory (706) may include at least one program product having a set (e.g., at least one) of program modules that are configured to carry out the functions of the embodiments described above with reference to FIGS. 1-6.

Program/utility (718), having a set (at least one) of program modules (720), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (720) generally carry out the functions and/or methodologies of embodiments as described herein. For example, the set of program modules (720) may be implemented as a tool configured to perform the embodiments described above with reference to FIGS. 1-6.

Host (702) may also communicate with one or more external devices (740), such as a keyboard, a pointing device, etc.; a display (750); one or more devices that enable a user to interact with host (702); and/or any devices (e.g., network card, modem, etc.) that enable host (702) to communicate with one or more other computing devices. In one embodiment, the display (750) visually displays a path selection during navigation of the path selection. Such communication can occur via Input/Output (I/O) interface(s) (710). Still yet, host (702) can communicate with one or more networks such as a local area network (LAN), a general wide area network (WAN), and/or a public network (e.g., the Internet) via network adapter (730). As depicted, network adapter (730) communicates with the other components of host (702) via bus (708). In one embodiment, a filesystem, such as a distributed storage system, may be in communication with the host (702) via the I/O interface (710) or via the network adapter (730). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

The aspects described herein may be embodied as a system, a method, and/or a computer program product. The computer program product may include a computer readable storage medium (or media) having computer readable program instructions thereon for causing a processor to carry out aspects of the present invention.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

What is claimed is:

1. A system comprising:
    a processing unit operatively coupled to memory;
    a tool in communication with the processing unit to dynamically navigate a route including:
        two or more points of interest modeled, including representing each point of interest as a node in a graph, and a path between any two nodes as an edge, the nodes and associated edge to form a route;
        characterize each node in the route, wherein the characterization includes assignment of a node signature to each of the nodes in the route; and
        dynamically create a navigation route from the modeled points of interest, including optimization of route selection based on the node signature and a route navigation device signature;
        navigate the selected route within a structure, including control a hardware addressable component in the route and within the structure; and
        monitor the route navigation and change an operating status of the addressable hardware component responsive to the monitored route navigation.

2. The system of claim 1, further comprising the processing unit to monitor one or more node attributes during route navigation, wherein each node attribute comprises node attribute data at least partially corresponding to an associated node signature, and the tool to dynamically update the node signature corresponding to the monitored node attributes during route navigation.

3. The system of claim 2, further comprising the tool to monitor one or more device attributes during route traversal, and the tool to dynamically update the device signature corresponding to the monitored device attribute during route navigation.

4. The system of claim 2, further comprising the tool to update an associated navigation map on the route navigation device showing position of the route navigation device relative to the route.

5. The system of claim 2, further comprising the tool to characterize a first subject traversing the route with a first subject profile, wherein the first subject profile is compared to one or more profiles of one or more second subjects at least one of previously or currently within the structure.

6. The system of claim 5, further comprising the tool to:
    match the first subject profile with at least one of the second subject profiles; and
    provide a route that matches the second subject profile.

7. A computer program product for dynamic route navigation, the computer program product comprising a computer readable storage device having program code embodied therewith, the program code executable by a processing unit to:
    model two or more points of interest, including representing each point of interest as a node in a graph, and a path between any two nodes as an edge, the nodes and associated edge to form a route;
    characterize each node in the route, wherein the characterization includes assigning a node signature to each of the nodes in the route;
    dynamically create a navigation route from the modeled points of interest, including optimizing route selection based on the node signature and a route navigation device signature;
    navigate the selected route within a structure, including control a hardware addressable component in the route and within the structure; and
    monitor the route navigation and change an operating status of the addressable hardware component responsive to the monitored route navigation.

8. The computer program product of claim 7, further comprising program code to monitor one or more node attributes during route navigation, wherein each node attribute comprises node attribute data at least partially corresponding to an associated node signature, and dynamically update the node signature corresponding to the monitored node attributes during route navigation.

9. The computer program product of claim 8, further comprising program code to monitor one or more device attributes during route traversal, and dynamically update the device signature corresponding to the monitored device attribute during route navigation.

10. The computer program product of claim 8, further comprising program code to update an associated navigation map on the route navigation device showing position of the route navigation device relative to the route.

11. The computer program product of claim 8, further comprising program code to:
- characterize a first subject traversing the route with a first subject profile; and
- compare the first subject profile to one or more profiles of one or more second subjects at least one of previously or currently within the structure.

12. The computer program product of claim 11, further comprising program code to:
- match the first subject profile with at least one of the second subject profiles; and
- provide a route that matches the second subject profile.

13. The computer program product of claim 7, wherein the program code to change an operating status of the addressable hardware component comprises program code to control at least one of conveyance availability proximate the monitored route, addressable component energization, and addressable component de-energization.

14. A method comprising:
- modeling two or more points of interest, including representing each point of interest as a node in a graph, and a path between any two nodes as an edge, the nodes and associated edge forming a route;
- characterizing each node in the route, wherein the characterization includes assigning a node signature to each of the nodes in the route;
- creating a navigation route from the modeled points of interest, including optimizing route selection based on the node signature and a route navigation device signature;
- navigating the selected route within a structure, including controlling a hardware addressable component in the route and within the structure; and
- monitoring the route navigation and changing an operating status of the addressable hardware component responsive to the monitored route navigation.

15. The method of claim 14, further comprising monitoring one or more node attributes during route navigation, wherein each node attribute comprises node attribute data at least partially corresponding to an associated node signature, and dynamically updating the node signature corresponding to the monitored node attributes during route navigation.

16. The method of claim 15, further comprising monitoring one or more device attributes during route traversal, and dynamically updating the device signature corresponding to the monitored device attribute during route navigation.

17. The method of claim 15, further comprising updating an associated navigation map on the route navigation device showing position of the route navigation device relative to the route.

18. The method of claim 15, further comprising:
- characterizing a first subject traversing the route with a first subject profile; and
- comparing the first subject profile to one or more profiles of one or more second subjects at least one of previously or currently within the structure.

19. The method of claim 18, further comprising:
- matching the first subject profile with at least one of the second subject profiles; and
- providing a route that matches the second subject profile.

20. The method of claim 13, wherein changing an operating status of the addressable component comprises controlling at least one of conveyance availability proximate the monitored route, addressable component energization, and addressable component de-energization.

* * * * *